United States Patent [19]

Roovers et al.

[11] Patent Number: 5,545,100
[45] Date of Patent: Aug. 13, 1996

[54] CONTINUOUSLY VARIABLE TRANSMISSION

[75] Inventors: Gijsbertus C. F. Roovers, Goirle; Bastiaan A. D'Herripon, Tilburg, both of Netherlands

[73] Assignee: Van Doorne's Transmissie B.V., Tilburg, Netherlands

[21] Appl. No.: 311,025

[22] Filed: Sep. 22, 1994

[30] Foreign Application Priority Data

Sep. 23, 1993 [NL] Netherlands .......................... 9301646

[51] Int. Cl.⁶ .................................................. F16H 15/48
[52] U.S. Cl. .......................... 475/185; 475/193; 475/197
[58] Field of Search ................................ 475/193, 183, 475/185, 190, 197

[56] References Cited

U.S. PATENT DOCUMENTS

| 2,973,671 | 3/1961 | Elkins . | |
|---|---|---|---|
| 2,974,547 | 3/1961 | Egan | 475/193 X |
| 4,909,101 | 3/1990 | Terry | 475/16 |

FOREIGN PATENT DOCUMENTS

| 0010329 | 4/1980 | European Pat. Off. . | |
|---|---|---|---|
| 1007589 | 5/1957 | Germany . | |
| 4-296241 | 10/1992 | Japan | 475/193 |
| 9001390 | 1/1992 | Netherlands . | |
| 1603889 | 2/1981 | United Kingdom | 475/193 |

Primary Examiner—Rodney H. Bonck
Assistant Examiner—Saul Rodriguez
Attorney, Agent, or Firm—Young & Thompson

[57] ABSTRACT

A continuously variable transmission comprises a sun wheel (11, 66) and at least one planet wheel (3, 65) having a double, essentially conical surface (30, 31, 64, 71, 72), which planet wheel (3, 65) interacts on one side with the sun wheel (11, 66) and on the other side with an annulus wheel (2, 73), as well as adjusting structure (5, 6, 16) for changing the transmission ratio. Each planet wheel (3, 65) is provided with an intermediate wheel (9, 59) which interacts on one side with the sun wheel (11, 66) and on the other side with the planet wheel (3, 65). Each planet wheel (3, 65) and, where appropriate, intermediate wheel (9, 59) is also adjustable about an imaginary axis which runs transversely to the centre line of the sun wheel (11, 66), such that each planet wheel (3, 65) can be brought into positions with respect to the annulus wheel (2, 59) in which they can roll with respect to one another so as to describe a helical path. As a result, the planet wheel (3, 65) and the sun wheel are given a different position with respect to one another in the axial direction, which produces a different transmission ratio.

32 Claims, 7 Drawing Sheets

CONTINUOUSLY VARIABLE TRANSMISSION

The invention relates to a continuously variable transmission, comprising a driving sun wheel (11, 66), at least one planet wheel (3, 65) having a double, essentially conical surface (30, 31, 64, 71, 72), which planet wheel (3, 65) interacts on one side with the sun wheel (11, 66) and on the other side with an annulus wheel (2, 73), as well as adjusting means (5, 6, 16) for changing the transmission ratio.

A transmission of this type, which is particularly suitable for a bicycle, is disclosed in NL-A-9001390. The disadvantage of this known transmission is that the adjustment thereof under torque loading is not possible and that the efficiency at high transmission ratios is poor.

The aim of the invention is, therefore, to provide a transmission of the abovementioned type which does not have said disadvantages. This aim is achieved in that each planet wheel (3, 65) is provided with an intermediate wheel (9, 59) which interacts on one side with the sun wheel (11, 66) and on the other side with said planet wheel (3, 65). Preferably, a multiplicity of planet wheels are employed, each planet wheel having an associated intermediate wheel; six may be mentioned as an example.

The intermediate wheel has a threefold effect. Firstly, the intermediate wheel makes it possible to achieve helical travel in the contact between the planet wheel and the intermediate wheel, as a result of which the planet can assume a different axial position under load; secondly, the intermediate wheel ensures that the input shaft and the output shaft have the same direction of rotation; and, thirdly, the combination of sun and intermediate wheel makes it possible to achieve an intermediate transmission, as a result of which an advantageous chain drive can be chosen, especially for a bicycle.

In connection with the provision of various transmission ratios, each planet wheel (3, 65) and, where appropriate, intermediate wheel (9, 59) is adjustable about an imaginary axis which runs transversely to the centre line of the sun wheel (11, 66), such that each planet wheel (3, 65) and the annulus wheel (2, 59) can be brought into positions in which they can roll with respect to one another so as to describe a helical path. As the planet wheels roll so as to describe a helical path with respect to the annulus wheel, said planet wheels are moved in the axial direction with respect to the sun wheel, which movement results in a change in the transmission ratio.

In order to make said movement possible, each planet wheel (3) is mounted on a slider (5, 74) which, parallel to the centre line of the sun wheel (1, 66), is slidable with respect to the slider carrier (6, 76).

Preferably, the sun wheel is rotatable about a fixed shaft (18, 68) and each planet wheel (3, 65) is rotatable about a shaft (4, 75) which is mounted in the slider (5, 74).

To ensure that the forces required for adjustment remain low, even at low speeds or when stationary, the shafts (4, 75) are provided on one side with fixed mountings (19, 77) and on the other side with movable mountings (21, 79) for each planet wheel (3, 65), such that the angle between the shaft (4, 75) of the planet wheel (3, 65) and the shaft (18, 68) of the annulus wheel (2, 73) can be varied between a position in which said shafts are in one and the same plane and a position in which they cross one another.

As soon as said shafts have been shifted with respect to one another to a crossed position and, as a consequence thereof, the planet wheel and annulus wheel have assumed an oblique arrangement, a shift takes place in the mutual engagement point of the planet wheel and annulus wheel when said wheels rotate. This means that a change takes place in the transmission ratio between the planet wheel and annulus wheel, because of the conical surface of the former.

A further important aspect is that when the shafts are pivoted relative to one another essentially all that occurs is that the planet wheel and annulus wheel roll over one another, as a result of which a low adjusting force is quite adequate to bring the shafts into the crossed position. If the wheels do not turn, no actual change in the transmission ratio takes place as yet: the planet wheel is turned slightly about an axis perpendicular to the surface of the annulus wheel.

However, as soon as said wheels are brought into rotation, the planet wheel rolls into its new position, which is determined by its initial oblique arrangement with respect to the annulus wheel, which repositioning can take place very rapidly. At that point in time the new transmission ratio has taken effect.

According to a suitable embodiment, the slider (5, 74) carries an arm (7, 82) which can be pivoted on a pivot (23, 83) essentially parallel to the main shaft (18, 68) and the mountings (19, 21; 77, 79) are so constructed that they can accommodate the mutually oblique arrangement of the shafts (4, 75).

The slider carrier (6, 76) carries gear-changing means with which the arm (7, 82) interacts in order to move the latter. Said gear-changing means comprise a gear-change hub (15, 84) which is essentially concentric with respect to, and rotatable about, the main shaft (18, 68), whilst the arm (7, 82) runs essentially radially with respect to the main shaft (18, 68) and at its radially innermost end has a nose (24, 86) which engages in a slot (25, 87) in the gear-change hub (15, 84).

The slot (25, 87) is elongated, such that the width thereof corresponds to the width of the nose (24, 86), and the slot (25, 87) crosses the main shaft (18, 68) in such a way that, after the shafts (4, 10; 75, 81) have been brought into the oblique arrangement with the resultant movement of the slider (5, 74) and of the arm (7, 82) connected thereto, the nose (24, 86) slides in the slot (25, 87), the arm (7, 82) pivoting back and the shafts (4, 10; 75, 81) consequently being brought out of oblique arrangement.

As already mentioned above, a new transmission ratio can be selected by placing the planet wheel at an angle relative to the annulus wheel and then bringing the transmission into rotation, the new position being achieved as a result of the helical path described by the planet wheel with respect to the annulus wheel, which is a consequence of the latter two wheels being in an oblique arrangement with respect to one another. Such a change in the transmission ratio can take place while a driving torque is being exerted on the transmission. According to the invention it is, however, also possible to select a new transmission ratio without rolling occurring such that there is a change in the relative positions of the planet wheel and annulus wheel. The prerequisite for this is, however, that the transmission is not under load from a driving torque. Such direct setting of a new transmission ratio, in the absence of a driving torque, is possible if the angle at which the slot runs with respect to the main shaft is so chosen that interaction of the nose and the slot does not itself produce a braking effect and the arm can be pivoted between two stops which restrict the deflection of the arm. The oblique slot forces the arm against one of the stops when the gear-change hub turns, after which the arm, and thus the slider connected thereto, has to follow the movement of the slot and consequently slides in the slot. By this means a change in transmission can be effected even when stationary.

To enable the transmission of high torques without slip occurring, the sun wheel and intermediate wheel can also have interacting gear wheel components.

According to a first possible embodiment, the intermediate wheel (9) has a conical surface (26) and a cylindrical ring (27), which protrudes with respect to said surface and works in concert with the intermediate wheel (9), and the sun wheel has a conical surface (28) which interacts with said conical surface (26) and is provided with a peripheral groove (29), the depth of which is greater than the distance over which the ring (27) protrudes with respect to the conical surface (26) of intermediate wheel (9), which ring (27) projects into groove (29).

As a consequence of the mutually interacting ring and peripheral groove, the intermediate wheel and the sun wheel have only little, or no, play in the direction of their centre line. As the planet wheel and the intermediate wheel do have to be movable with respect to one another, the shaft (10) of the intermediate wheel (9) is pivotably mounted parallel to the centre line of said shaft (10) in the mounting points (20, 22) on the slider (5).

The sun wheel (11) is axially movable on a drive hub (13) rotatably mounted on the main shaft (18), whilst sun wheel (11) and drive hub (13) are coupled by at least three regularly distributed thrust arms (12) which cross the centre line of the main shaft (18) and, when a driving torque is applied to the drive hub (13), attempt to push the sun wheel (11) away in the axial direction in such a way that the conical surface (28) of the sun wheel (11) is forced against the conical surface (26) of the intermediate wheel (9) as a function of the torque.

If the sun wheel (11) is forced in the direction away from the drive hub (13) under spring pretensioning, free-wheeling is also ensured when no driving torque is exerted and the mechanism engages as soon as a positive torque is applied.

According to a further possibility, that surface of the planet wheel (3) which interacts with the annulus wheel (2) has a first conical surface (30) which axially is on the outside and has a top angle which differs from that of the second conical surface (31) which adjoins said first conical surface and is located further inwards. With this construction the pinching force can be optimally adapted.

The transmission according to the invention is particularly suitable for a bicycle. In that case, a wheel hub (1) is provided which is rotatably supported on one side on the outside of the drive hub (13) and on the other side on the cage (6), the annulus wheel (2) being fixed to the inside of said wheel hub (1).

According to a second possible embodiment, the intermediate wheel (59) has a cylindrical surface (60), the sun wheel (66) has a cylindrical surface (62) which interacts with said cylindrical surface (60) and the maximum diameter of the intermediate wheel (59) is greater than the smallest gap between the surfaces of planet wheel (65) and sun wheel (66), such that the intermediate wheel (59) can be forced as a wedge between planet wheel (65) and sun wheel (66).

Preferably, the intermediate wheel (59) has a cylindrical ring (61), which protrudes with respect to its surface (60), and the surface (62) of the sun wheel (66) is provided with a peripheral groove (63), the depth of which is greater than the distance over which the Ping (61) protrudes with respect to the cylindrical surface (60) of the intermediate wheel (59), which ring (61) projects into groove (63). The sun wheel and intermediate wheel are positioned with respect to one another in their axial direction by means of the ring and groove.

The essentially conical surface (64) of the planet wheel (65), which surface interacts with annulus wheel (73), can also be slightly curved.

The slightly convex but essentially conical surface (64) of the planet wheel provides for the necessary contact between the various mutually interacting friction surfaces of sun wheel, intermediate wheels, planet wheels and annulus wheel. The convex surface (64) is needed to control the position of the intermediate wheel in the wedge between sun wheel and planet wheel. High press-on forces are generated in a position close to the radial which connects the centre lines of sun wheel and planet wheel. Lower press-on forces are generated in a position further away. An optimum adjustment of the press-on force on the position of the planet wheel (and thus of the transmission ratio) can be achieved by choosing a suitable curvature for the convex surface. A curvature of this type can also be approximated by an assembly of, for example, three conical surfaces.

Preferably, spring pretensioning is used so that the intermediate wheel (59) can be held in the wedge between sun wheel (66) and planet wheel (65).

Adjustment of the intermediate wheel is made possible because the shaft (81) of the intermediate wheel (59) is mounted in a yoke (92), one arm (93) of which is mounted on the slider carrier (76) and another arm (94) of which is movably supported around the main shaft. To this end, that arm (94) of the yoke (92) which is movably supported around the main shaft (68) works in concert with a supporting ring (95) which is rotatably mounted on the main shaft, which supporting ring (95) carries a lip (96) which extends essentially axially with respect to the main shaft (68) and is provided with an essentially axial slot (97) in which the nose (86) of arm (82) is accommodated so that it is slidable in the axial direction of the main shaft (68).

Figure 5:
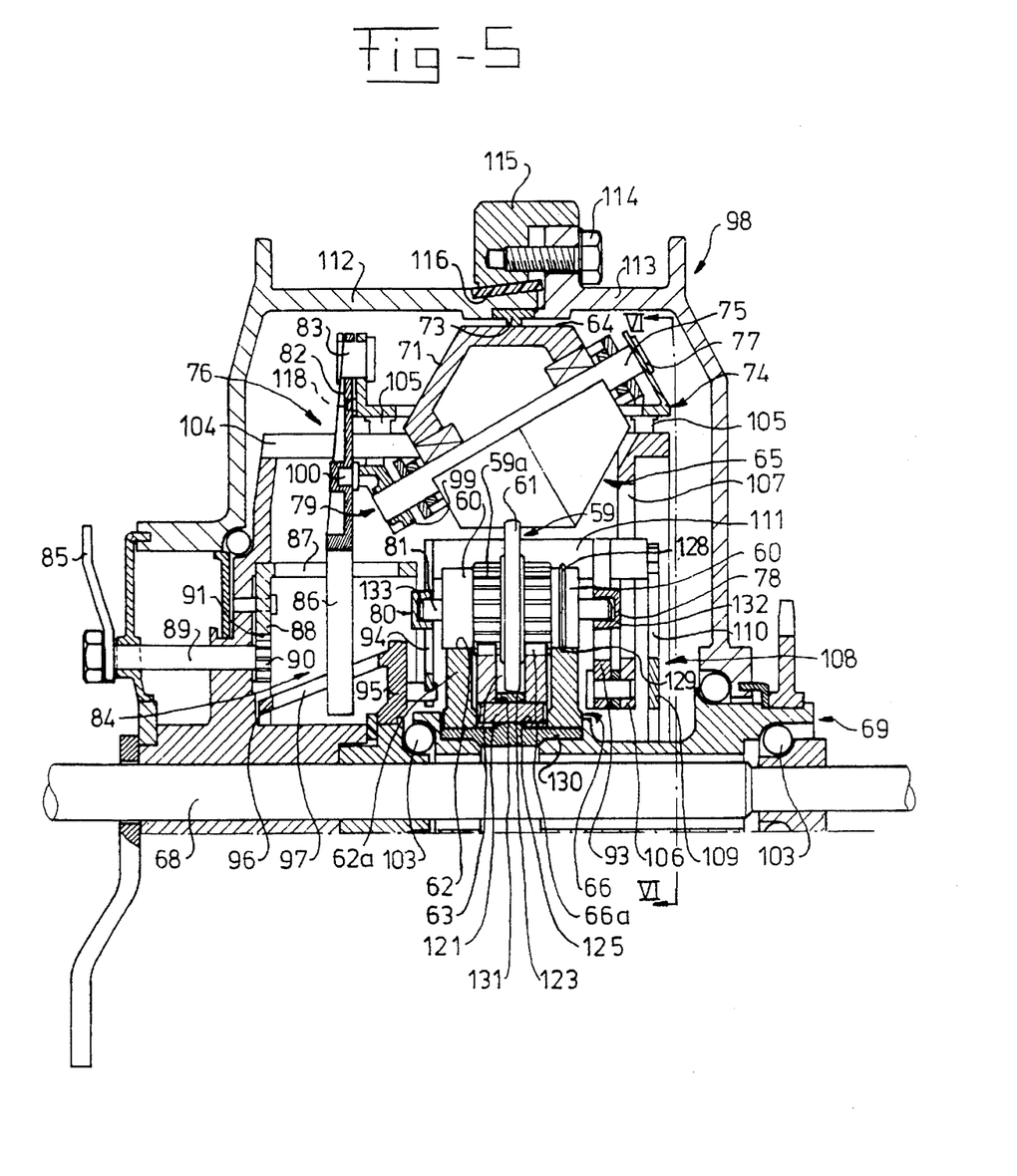
FIG. 5 shows a partial cross-sectional view of a second embodiment of the transmission according to the invention.

In the embodiment shown in FIG. 5, the whole of the torque is transmitted via the gear wheels and the sole purpose of the rings located alongside is, on the one hand, to absorb the radial press-on force and relieve the load on the gear wheels and, on the other hand, to make the mechanism stable.

As already mentioned above, the sun wheel and intermediate wheel can interact with one another by means of gear wheels, in order to transmit high torques without slip. In order to make it possible to effect a small adjustment of the angle of the intermediate wheel with respect to the sun wheel in this embodiment as well, the sun wheel (66) is provided with two gear wheels (66a), which are rotatably mounted on the main shaft (68) and are located either side of a fixed collar (123) provided on the main shaft, through which collar at least one pin (121) extends transversely, and the ends of the pin (121) project, in each case, into a hole (125) in one of the gear wheels (66a), which pin (121) can be pivoted about a radially aligned pivot axis, such that the gear wheels can undergo movement through an angle which is of equal magnitude but in the opposite direction, which gear wheels (66a) interact with teeth (59a) provided on each intermediate wheel (59).

The invention will now be described in more detail with reference to the illustrative embodiment shown in the figures.

FIG. 8 shows a variant of the drive hub.

Figure 1:
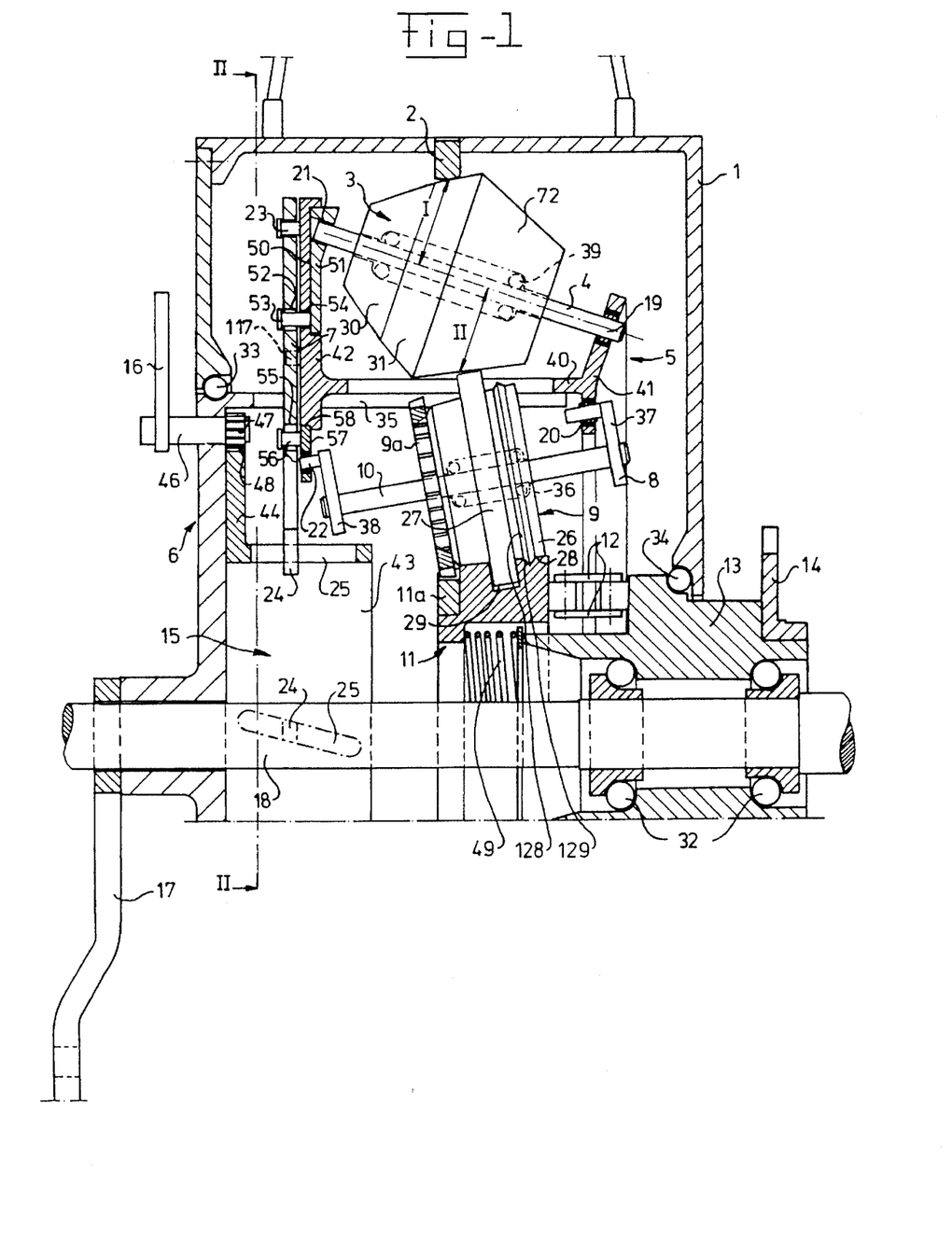
FIG. 1 shows a partial cross-sectional view of a first embodiment of the transmission according to the invention.
Figure 2:
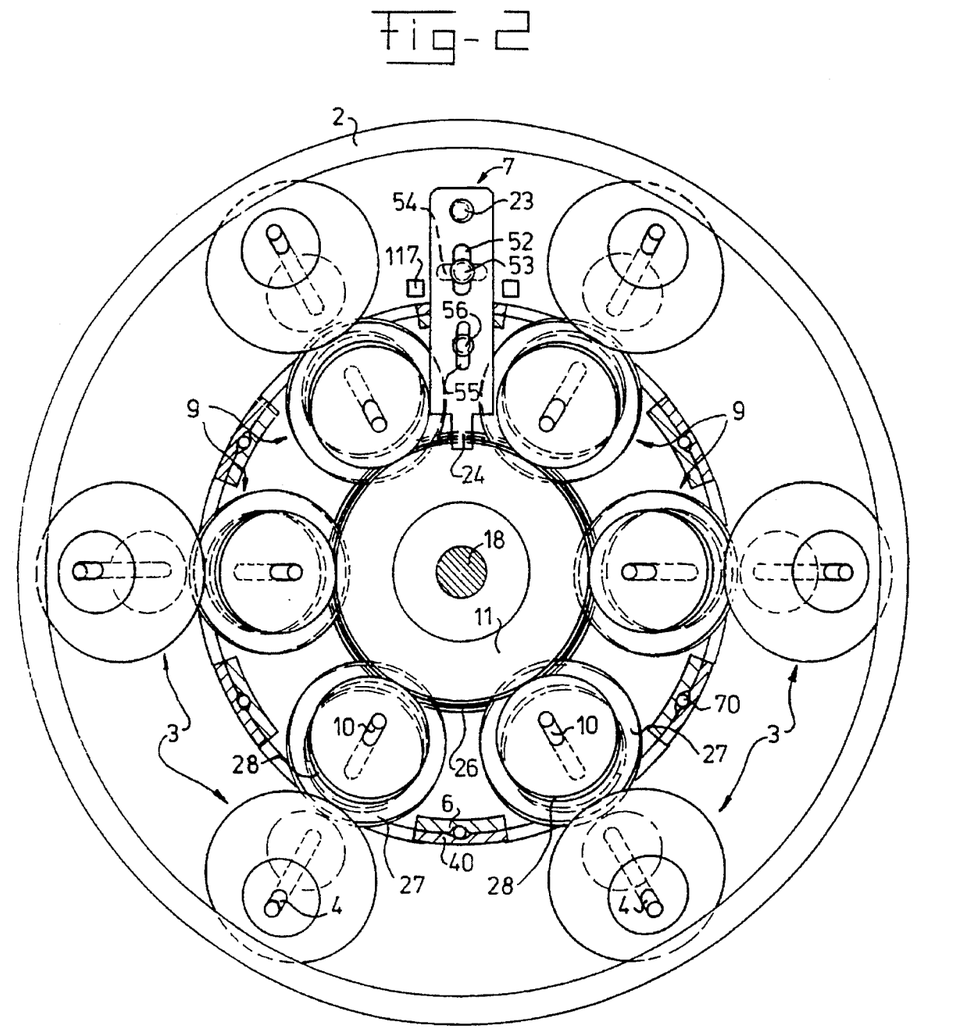
FIG. 2 shows a front view.

FIGS. 1 and 2 show the transmission as used in the wheel hub 1 of a bicycle. Said wheel hub 1 is rotatable about the main shaft 18, which is mounted in the frame, which incidentally has not been drawn, of a bicycle.

The drive hub 13 is rotatably mounted on the main shaft 18 by means of bearings 32. A sprocket wheel 14, on which the chain for a bicycle drive can be fitted, is mounted on said drive hub 13.

The flange or slider carrier 6 is rigidly fixed to the opposite end of the main shaft. A reaction stay 17 is attached to the slider carrier 6 and, in its turn, is fixed to said frame. The complete wheel hub 1 is rotatably accommodated by means of bearings 33, 34 on said slider carrier 6 and, respectively, on the drive hub 13.

The drive hub 13 is linked to the sun wheel 11 by means of push bars 12. When a torque is applied to the drive hub 13, said push bars 12 attempt to push the sun wheel 11 away from the drive hub 13 (see FIG. 3a).

Spring 49 continuously attempts to push the sun wheel 11 away from the drive hub 13.

In the embodiment shown in FIGS. 1 and 2, the sun wheel 11 has a conical surface 28, which interacts, under friction, with the likewise conical surface 26 of intermediate wheel 9. A groove 29 is present in the conical surface 28 of sun wheel 11. A cylindrical ring 27 on the intermediate wheel 9 interacts with said groove 29. The depth of the groove 29 is such that the cylindrical ring 27 does not reach the bottom of said groove. The sun wheel 11 and the intermediate wheel 9 are positioned in the direction of a centre line and with respect to one another by means of peripheral groove 129 and peripheral rib 128.

The intermediate wheel 9 is rotatably and slidably mounted on the intermediate wheel shaft 10 by means of bearings 36. Said intermediate wheel shaft 10 is mounted by means of arms 37, 38, on which the bearing journals 20 and 22 respectively are mounted, on the slider, which is indicated in its entirety by 5. Said slider is mounted on the slider bush 35 so as to be slidable parallel to the direction of the main shaft 18, said slider bush 35 being part of slider carrier 6.

The planet wheel 3 is also mounted on the slider 5. Said planet wheel 3 is rotatable about, and slidable on, the planet shaft 4 by means of bearings 39.

The slider 5 has a cylindrical section 40, which is slidable on the slider bush 35. At one end, said cylindrical section is provided with a flange 41, which extends radially inwards and outwards. At its other end the cylindrical section 40 is provided with a flange 42, which extends radially inwards and outwards.

The pin 20 of arm 37 is pivotably mounted in the flange 41, specifically in the section thereof which extends radially inwards. The end 19 of shaft 4 is mounted in the radially outermost part of flange 41.

The flange 42 has an annular recess 50, in which ring 51 is rotatably mounted. The end 21 of the planet shaft 4 is mounted in the ring 51, in its turn. The adjuster arm 7 is also pivotably mounted on flange 42 by means of pivot 23. The adjuster arm 7 has a slot 52, into which journal 53, which is mounted on the ring 51, projects. Said journal 53 extends through slot 54 in flange 42.

Adjuster arm 7 also has a slot 55, into which journal 56, which is mounted on ring 57, projects. Said ring is accommodated in recess 58 in that part of flange 42 which faces radially inwards with respect to the cylindrical section 40. The journal 22 of arm 38 is pivotably mounted in the ring.

The radially innermost end, or the nose, 24 of arm 7 is slidably mounted in a slot 25 which runs obliquely and has been made in gear-change hub 15. Said gear-change hub 15 comprises a cylindrical section 43 which is concentric with the main shaft 18. Flange 44, which is rotatable within the slider bush 35, is connected to the cylindrical section 43. At its radially outermost end, the flange 44 has a crown gear 48, which interacts with the pinion 47, which in its turn is connected via shaft 46 to the operating arm 16. On turning the operating arm, the gear-change hub 15 is also turned, which leads to the adjuster arm 7 being pivoted.

The intermediate wheel 9 and the planet wheel 3 are arranged with respect to one another in such a way that the annular surface 27 of intermediate wheel 9 interacts with the surface 72 of planet wheel 3.

Finally, an annulus wheel 2 is attached to the inside of the wheel hub 1, which annulus wheel 2, in its turn, interacts with, in each case, one of the conical surfaces 30, 31 of planet wheel 3.

It is pointed out that the construction of the transmission according to the invention has been described above with reference to a sun wheel with a single pair comprising an intermediate wheel 9 and a planet wheel 3. However, as shown in FIG. 2, a multiplicity of intermediate wheels 9 and planet wheels 3 is preferably used, such as the total of 6 shown.

The transmission according to the invention functions as follows. The drive torque is transmitted via a chain and sprocket wheel 14 to drive hub 13. By means of the push bars 12 (see FIG. 3a), the sun wheel 11 is driven under a certain axial force, which depends on the torque applied and the prevailing transmission ratio. Spring 49 forces the sun wheel into contact with intermediate wheel 9, the planet 3 and the annulus 2. In this way a free-wheeling action is obtained, because the friction wheels are able to slip when the drive torque is removed. The mechanical contact between the bodies is maintained by the spring pretensioning of spring 49 and, therefore, when there is positive torque the associated torque-dependent press-on force is generated immediately.

The embodiment of the transmission which has been described above is suitable for driving in a single direction of rotation, that is to say that direction in which an axial thrust is obtained by means of the push bars 12. According to an alternative embodiment, the transmission can, however, also be used for driving in both directions. To this end, as shown in the variant in FIG. 3b, two sets of push bars 12 and 12' running in opposing directions are used, each set having a slotted hole 119, via which they interact with a pin 120, which is mounted on the sun wheel. In the position shown, a driving effect is exerted in the direction of the arrow, the push bars 12' providing the transmission from the drive hub 13 to the sun wheel 11.

Figure 3A:
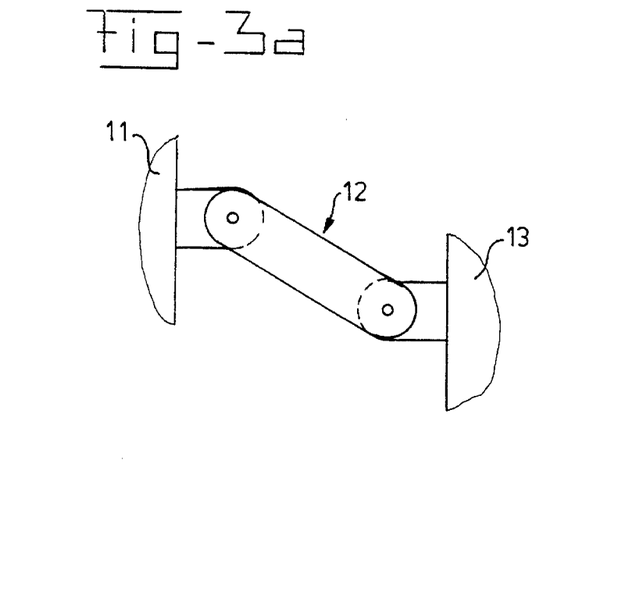
FIGS. 3a and b show possible details of the drive hub.
Figure 3B:
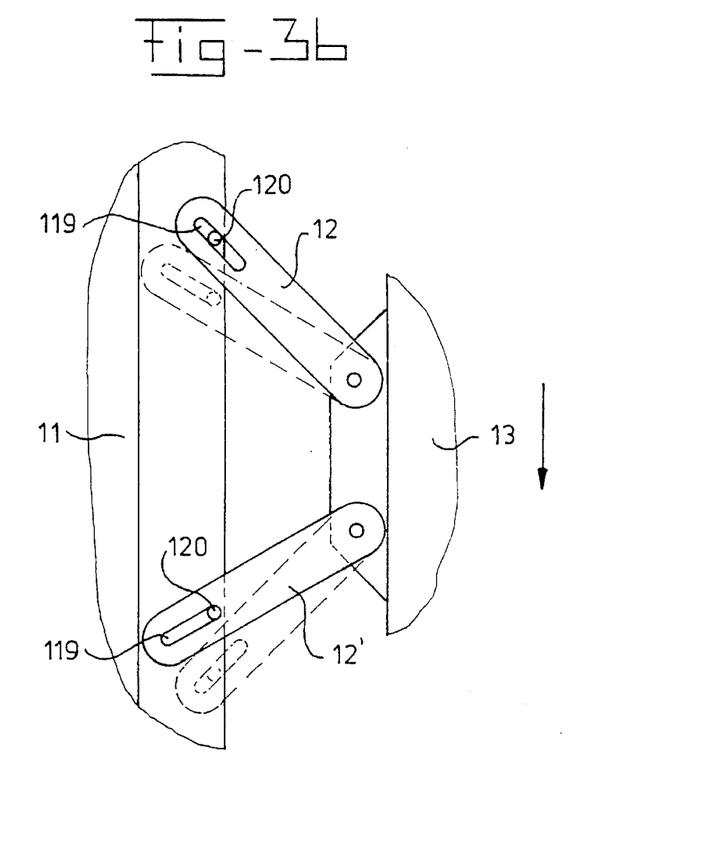

The position indicated by broken lines gives a drive from the drive hub 13 to the sun wheel 11 in the opposing direction to that shown by the arrow. Free-wheeling is possible in the intermediate region, that is to say the region in which both pins 120 are not in contact with the end of the associated slotted hole 119.

The planet wheel 3 is driven via sun wheel 11 and intermediate wheel 9, which planet wheel makes it possible to change the transmission ratio, as a consequence of the change in the radii of travel I and II.

Changing of the transmission ratio, or gear changing, is effected by pivoting the planet shaft 4 and intermediate wheel shaft 10 with respect to the main shaft 18 in such a way that they come into a position where they cross the latter.

Said shafts 10 and 4 are brought into an oblique arrangement by means of adjuster arm 7, gear-change hub 15 and gear-change arm 16. Gear-change arm 16 is pivotably mounted, by means of shaft 46, in the slider carrier 6. Shaft 46 carries a pinion 47, with engages in crown gear 48 of gear-change hub 15. On turning gear-change arm 16, for example by means of a cable connected thereto, gear-change hub 15 is also turned.

When gear-change hub 15 is turned, the adjuster arm 7 is also pivoted since this is located with its nose 24 in the oblique slot 25 in the cylindrical section 43 of the gear-change hub 15. As a consequence of said oblique arrangement of the shafts 10, 4, the cylindrical ring 27 of intermediate wheel 9 also assumes an oblique position with respect to the conical surface 30 of planet wheel 3. Ring 27 therefore has some play in groove 29.

As a consequence of the tracking forces which arise as a result of said oblique arrangement, planet wheel 3 and intermediate wheel 9 attempt to move relative to one another in the direction of their shafts over a helical path. A helical movement is also imposed on the planet wheel 3 because shaft 4 and annulus wheel shaft 18 cross one another. Via the planet wheel 3, the annulus wheel 2 forces the slider 5 in the axial direction. The two movements produced by annulus wheel 2 and intermediate wheel 9 work together to move the slider. However, the intermediate wheel 9 is held in the direction of its shaft 10 as a consequence of the interaction between groove 29 of sun wheel 11 and annular surface 27 of intermediate wheel 9. This means that the intermediate wheel 9 remains in position and that planet wheel 3 has to move.

The result of this is that the slider 5 slides in the axial direction with respect to the slider bush 35. As a consequence of the fact that slot 25 runs obliquely in cylindrical section 43 of the gear-change hub 15, sliding of slider 5 is also accompanied by pivoting of the adjuster arm 7 back to its original position. This, in turn, has the result that the shafts 10, 4 move back from their crossed position into the position in which they intersect one another. In this latter position the intermediate wheel 9 and planet wheel 3 are no longer in an oblique arrangement and the new transmission ratio has taken effect.

When the slider 5 slides, the planet wheel 3 also slides with respect to its shaft 4, which is made possible by bearing 39.

As the intermediate wheel 9 is also slidable with respect to shaft 10 by means of bearing 36, the slider 5 can execute the axial movement with the shaft 10 whilst intermediate wheel 9 remains in position in that direction.

Large forces are not produced on changing gear, i.e. on pivoting of the adjuster arm 7: the shafts 10, 4 are turned with respect to shaft 18, which generates only very low frictional forces between planet wheel 3 and intermediate wheel 9 with respect to one another. The axial forces which are then produced when intermediate wheel 9 and planet wheel 3 are rotated relative to one another lead to displacement of the slider 5. The subsequent pivoting of adjuster arm 7 into its neutral position then produces the new transmission ratio. The eventual change in the transmission ratio is thus effected during rotation of the various wheels with respect to one another, whilst initiation of the change in the transmission ratio has already taken place beforehand.

As already mentioned, a torque- and transmission-dependent pinching force is generated between the various wheels by means of push bars 12. FIGS. 3a, 3b show that the push bar 12 assumes an oblique position between drive hub 13 and sun wheel 11. When a torque is applied to the drive hub 13 the push bar 12 attempts to push the sun wheel 11 away, but the sun wheel 11 is held back by the intermediate wheel 9. The desired pinching force is thus obtained.

FIG. 8 shows a variant of the drive hub. The purpose of this variant is to compensate for the torque-dependent elastic deformation of the rotating bodies and the hub casing which arises as a result of the axial press-on force, so that the push bars 12 are not able to assume too great an actuating angle, by which means overload is prevented and there is a beneficial effect on the efficiency of the transmission. Drive hub 122 of this variant once again carries a sprocket wheel 14. The drive hub 122 also carries a pressure element 124 which is rotatable and is slidable in the axial direction. Said pressure element 124 interacts with the drive hub 122 via a groove 134 and a ball 135 mounted in the drive hub 122, which groove and ball together form a sort of screw connection 127.

Pressure element 124 is continuously forced in the direction away from the sun wheel 11 by means of cupped spring washers 126, which bear against flange 136.

The pressure element 124 is also connected to a number of push bars 137, which in their turn are connected to the sun wheel 11. By means of spring 49, the sun wheel 11 is continuously forced away from flange 136, and thus from hub 122.

As soon as a driving torque is applied to the drive hub 122 by means of sprocket wheel 14, the push bars 137 attempt to force the sun wheel 11 away from the drive hub 122, said push bars 137 then making a smaller angle with the main shaft 18. When said angle becomes too small the problem arises that for a specific torque applied to the drive hub 122, the press-on force as exerted on the sun wheel 11 becomes very high. Such a high press-on force must be avoided since otherwise the internal construction of the transmission would be placed under too great a stress.

In the variant in FIG. 8, too small an angle between push bars 137 and main shaft 18 is prevented by the pressure element 124 starting to move in the direction towards the sun wheel 11 as soon as the press-on force on sun wheel 11 reaches a certain threshold value. This movement is generated by the interaction between the ball 135 and the groove 134. The threshold value at which said movement occurs is determined by the strength of the cupped spring washers 126. As soon as the pressure element 124 shifts in the direction of the sun wheel 11, the angle which the push bars 137 make with respect to the main shaft 18 increases again, as a result of which press-on forces which are too high are avoided.

Figure 4:
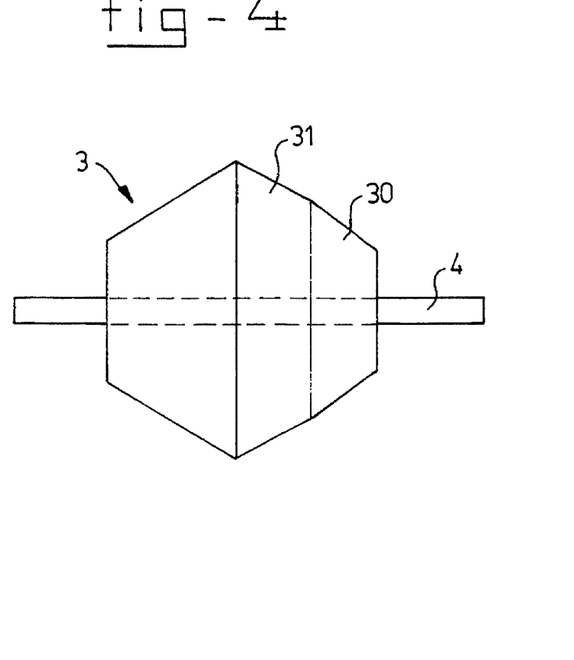
FIG. 4 shows a planet wheel used in the transmission according to FIGS. 1 and 2.

As shown in FIG. 4, the planet wheel can have a first conical surface 30 and a second conical surface 31 having a top angle differing from that of the first surface 30. The increase in the pinching force when changes are made in the transmission ratio is greater in those cases where the annulus wheel 2 interacts with the first conical surface 30 of planet wheel 3 than in the cases where the annulus wheel 2 interacts with the second conical surface 31. In the case of interaction between the annulus wheel 2 and the second conical surface 31, a different angle is assumed by the push bar 12, as a result of which optimum adjustment of the pinching force is possible.

Figure 6:
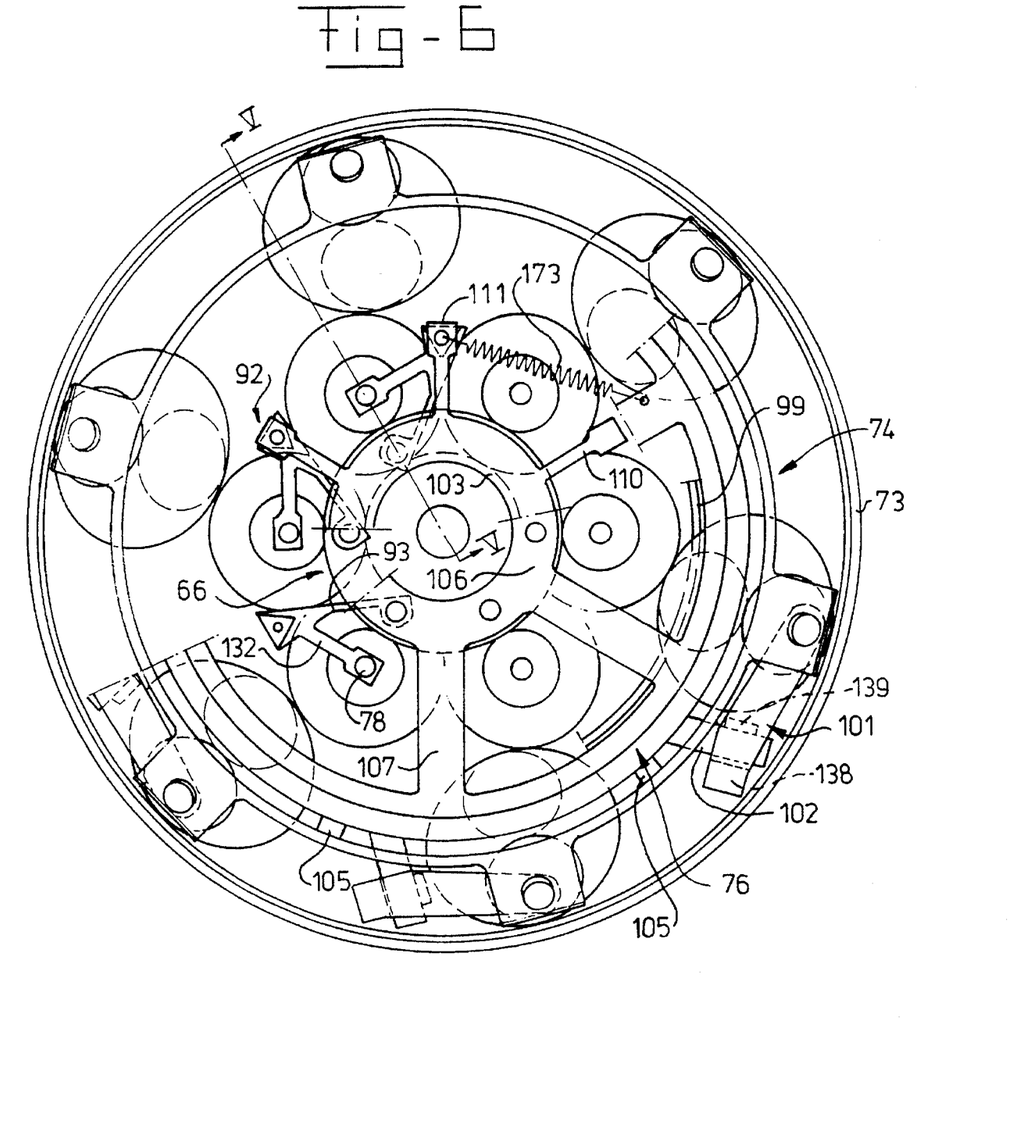
FIG. 6 shows a front view.
Figure 7:
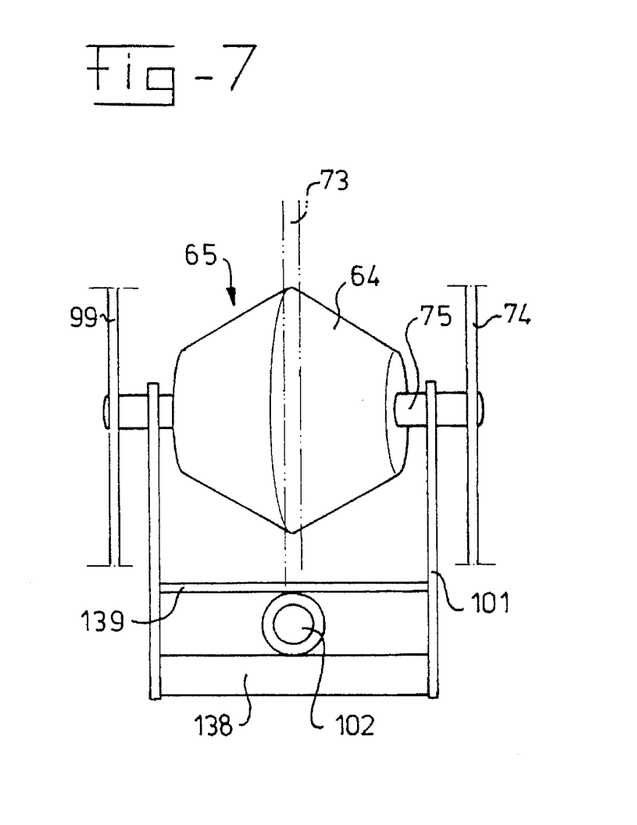
FIG. 7 shows a detail of the planet wheel mounting in the transmission according to FIGS. 5 and 6.

Intermediate wheels 59 which have cylindrical surfaces 60 are used in the second embodiment of the transmission according to the invention which is shown in FIGS. 5 to 7. Here also, the intermediate wheels 59 have a protruding ring 61. In addition, a sun wheel 66 is provided which also has cylindrical surfaces 62, which interact with the cylindrical surfaces 60 of the intermediate wheel 59. A peripheral groove 63 is made in the sun wheel, the depth of said groove being greater than the height of the ring 61 to an extent such that said ring 61 does not come into contact with the bottom of the groove 63. There is also a V-shaped peripheral rib 128 on one of the cylindrical surfaces 60, which peripheral rib fits tightly in a correspondingly shaped peripheral groove 129 in the associated cylindrical surface 62. Sun wheel 66 and intermediate wheel 59 are positioned accurately in the axial direction with respect to one another by means of peripheral rib 128 and peripheral groove 129. As a consequence of the V-shape of the groove and rib, the shafts are able to cross, whilst, at the same time, a minimal play can suffice, with the result that a high uniformity in position can be achieved in the various steps.

The intermediate wheel 59 interacts with a planet wheel 65, which has a first conical surface 71 and a second conical surface 64, which is slightly convex or comprises a few conical surfaces so that it approximates to a convex shape. This slightly convex surface 64 interacts with the annulus wheel 73 which is mounted on the inside of the wheel hub 98. The intermediate wheel 59 is held firmly in the wedge between sun wheel 66 and planet wheel 65. See FIG. 6, in which it can be seen that the intermediate wheel 59 is located somewhat outside the radial which extends from the sun wheel 66 to the relevant planet wheel 65. Intermediate wheel 59 is forced into the wedge under pre-tension by means of tension spring 133.

The intermediate wheel 59 is pressed harder against sun wheel 66 and planet wheel 65 by a driving torque, as a result of which a torque-dependent pinching force is obtained.

The intermediate wheel 59 is driven by the gear wheels 66a which form part of sun wheel 66. The radial press-on force which is produced by the drive torque and by the intermediate wheel being held firmly in the wedge-shaped gap between sun wheel 66 and planet wheel 65 is absorbed by the supporting rings 62a which are freely rotatable about the drive hub, in particular bush 130 thereof. The gear wheels 66a are connected to one another via a hinge pin 121. Said hinge pin 121 also passes through a collar 123 which is integral with the bush 130 and specifically passes through hole 131 in said collar. Hinge pin 121 can tilt about an imaginary pivot axis which runs transversely with respect to main shaft 68, in such a way that when the intermediate wheel 59 is at an angle the one gear wheel can rotate forwards about the drive shaft and the other can rotate backwards somewhat, the two gear wheels continuing to transmit torque to the intermediate wheels 59.

The sun wheel 66 is rigidly fixed to the drive hub 69, which is rotatably supported by means of ball bearings 103 on the main shaft 68. Said main shaft also carries the slider carrier 76, which is provided with slider bush 104. By means of slide bearings 105, the slider 74 is slidable on said slider bush in the axial direction with respect to the main shaft 68. Said slider has fixed mountings 77 for the shaft 75 of the planet wheel 65.

At the other end, the shaft 75 of the planet wheel 65 is provided with a movable mounting 79, which is formed by a ring 99 which is rotatable within slider bush 104. Said ring 99 carries a journal 100, which interacts with the arm 82.

Arm 82, in its turn, is pivotably mounted on slider 74 by means of hinge pin 83.

Arm 82 has a nose 86 which extends radially inwards and is accommodated in a slot 87 which runs crosswise with respect to the centre line of the main shaft 68. The various features are as shown in FIG. 1. The slot 87 is located in the gear-change hub 84, which is rotatably mounted by means of its flange 88 in the slider carrier 76. At its end which radially is furthest inside, said flange 88 has a crown gear 91, which interacts with pinion 90 mounted on shaft 89. Shaft 89 can be turned by means of lever 85, which per se can again be connected to an operating element, which is not shown.

By operating lever 85, the arm 82 is pivoted via gear-change hub 84. Arm 82, in its turn, takes the shaft 75 of the planet wheel 65 with it, as a result of which said planet wheel is brought into an oblique position.

Nose 86 likewise projects into a slot 97, which is located in a lip 96 fixed to supporting ring 95. Said supporting ring is mounted so as to be rotatable about the main shaft 68 and supports one arm 94 of the yoke 92 in which the intermediate wheel 59 is mounted. The yoke 92 has a further arm 93, which is mounted on a ring 106 which is fixed to the slider carrier 76 by means of spokes 107. Finally, yoke 92 has arms 132 and 133, in which the shaft 81 of intermediate wheel 59 is mounted.

When the arm 82 is pivoted by operating the lever 85, as described above, lip 96 is also pushed aside, as a result of which supporting ring 95 turns. Supporting ring 95, in its turn, then takes arm 94 of yoke 92 with it. As a result the shaft 81 of intermediate wheel 59 is brought into an oblique position with respect to the centre line of the main shaft 68.

As the distance of slot 97 from the pivot point 83 of arm 82 is greater than the distance of journal 100 from said pivot point 83, the arm 94, and thus the shaft 81, are pivoted to a greater degree than is ring 99, and thus shaft 75 of planet wheel 65. The consequence of this is that planet wheel 65 and annulus wheel 73 assume an oblique arrangement, which has the result that planet wheel 65 and annulus wheel 73 want to roll with respect to one another so as to describe a helical path. However, annulus wheel 73 remains in position and planet wheel 65 is therefore forced to move in the axial direction of the main shaft 68, taking slider 74 with it over the slider carrier 76. As the intermediate wheel 73 is also obliquely arranged with respect to planet wheel 65, when planet wheel 65 moves it also rolls with respect to intermediate wheel 59 so as to describe a helical path.

In the same way as with the embodiment described above, a helical movement is, as has been stated, Forced on the planet wheel 65 because the shaft 75 of the planet wheel 65 and the shaft 68 of the annulus wheel 73 cross one another. Via the planet wheel 65, the annulus wheel 73 pushes the slider 76 in the axial direction. The two movements produced by annulus wheel 73 and intermediate wheel 59 act together to move the slider 76.

As the slot 87 is located at an angle, in exactly the same way as in FIG. 1, arm 82 is pivoted back when said movement occurs, the shafts 81 and 75 then being restored to their positions in which they intersect the main shaft 68. In this position the intermediate wheel 59 and the planet wheel 65 again roll with respect to one another along normal circular paths and a new transmission ratio is obtained.

The yokes 92 are held in identical positions with respect to one another by a positioner, which is indicated in its entirety by 108 and which comprises a central ring 109 having fingers 110 pointing radially outwards. Said fingers 110, in their turn, are attached to the transverse beam 111 of yoke 92.

The arm 94 of yoke 92 is relatively rigid, whereas the arm 94 is relatively flexible. The consequence of this is as follows.

If an intermediate wheel/planet wheel combination has too high a transmission ratio, this transmits a greater than average force. As a result the intermediate wheel 59 is forced more deeply into the wedge between the sun wheel 66 and the planet wheel 65. This position gives rise to a reactive force on the finger 110, which causes the yoke 92 to turn through a small angle. As a result of this turning, a restoring force is exerted on intermediate wheel 59 and planet wheel 65, as a result of which only this intermediate wheel 59/planet wheel 65 combination lowers its ratio. The problems of slip are minimised as a result of this correction.

The resultant of the planet force always passes through the radial from sun to annulus wheel. In order to reduce the load on the ring 99 the planet resultant is braced against a supporting roller 102 which is positioned on this radial. A yoke 101 which can roll over the supporting roller 102, and thus is also able to turn through the angles required for gear changing, is fixed to the planet shaft 75. As the slider 74 moves in the axial direction the supporting beam 138 can move with it over the roller 102, the planet shaft 75 retaining the correct position. The yoke 101 comprises a retaining strip 139 which ensures that the supporting beam remains in contact with the supporting roller 102.

The wheel hub 98 comprises two halves 112, 113, which can be pulled together by means of bolts 114. Wheel hub 112 carries a supporting ring 116 which tapers upwards to form a wedge. Clamping ring 115, which can be tightened by means of bolts 114, rests on half 113 of the wheel hub. By this means the wedge-shaped surfaces of clamping ring 115 and supporting ring 116 move relative to one another, as a result of which annulus wheel 73 is forced radially inwards. By this means the desired forces keeping the various components of the transmission in contact with one another can be adjusted with great accuracy.

It will be clear that the invention is not restricted to the embodiments shown but that many further embodiments are conceivable within the scope of the invention. For instance, the transmission according to the invention can also be provided with mechanical, electrical or electro-mechanical adjusting means, for which the transmission is outstandingly suitable in view of the low adjustment forces required and the possibility of gear changing under all conditions.

It is also mentioned here that the control signals for adjustment of the transmission ratio of the transmission can be obtained by manual operation (by the cyclist), but also via a control unit which determines the ratio on the basis of, for example, pedalling speed, cycle speed, the force exerted on the pedals and measurements of the cyclist's heart rate and lactate levels, so that an automatic gear unit is obtained which is outstandingly suitable for numerous applications.

In addition to the abovementioned use on a bicycle, many other applications of the transmission according to the invention are conceivable. Applications in power units and windmills are mentioned as examples. Furthermore, the transmission is suitable for regulating the speed of alternators in vehicles such as coaches and larger private cars.

Moreover, it is also pointed out that, especially for use of the transmission for bicycles, a brake can be incorporated in the transmission or can be connected thereto.

We claim:

1. Continuously variable transmission, comprising a sun wheel (11, 66), at least one planet wheel (3, 65) having a double, essentially conical surface (30, 31, 64, 71, 72), which planet wheel (3, 65) interacts on one side with an annulus wheel (2, 73), as well as adjusting means (5, 6, 16) for changing the transmission ratio, characterized in that each planet wheel (3, 65) is provided with an intermediate wheel (9, 59) which interacts on one side with the sun wheel (11, 66) and on the other side with said planet wheel (3, 65) on the other side of the planet wheel (3, 65) from said annulus wheel (2, 73), wherein each planet wheel (3, 65) and, where appropriate, intermediate wheel (9, 59) is adjustable about an imaginary axis which runs transversely to the center line of the sun wheel (11, 66), such that each planet wheel (3, 65) can be brought into positions with respect to the annulus wheel (2, 59) in which they can roll with respect to one another so as to describe a helical path.

2. Transmission according to claim 1, wherein each planet wheel (3, 65) is mounted on a slider (5, 74) which is slidable parallel to the centre line of the sun wheel (11, 66).

3. Transmission according to claim 2, wherein the sun wheel (11, 66) is rotatable about a fixed main shaft (18, 68) and each planet wheel (3, 65) is rotatable about a shaft (4, 75) which is mounted in the slider (5, 74).

4. Transmission according to claim 3, wherein the slider (5, 74) is provided on one side with fixed mountings (19, 77) and on the other side with movable mountings (21, 79) for, in each case, one planet wheel (3, 65), such that the angle between the shaft (4, 75) of the planet wheel (3, 65) and the shaft (18, 68) of the annulus wheel (2, 73) can be varied between a position in which said shafts are in one and the same plane and a position in which they cross one another.

5. Transmission according to claim 4, wherein the slider (5, 74) carries an arm (7, 82) which can be pivoted on a pivot (23, 83) essentially parallel to the main shaft (18, 68) and the mountings (19, 21; 77, 79) are so constructed that they can accommodate the mutually oblique arrangement of the shafts (4, 75).

6. Transmission according to claim 5, wherein gear-changing means (15, 16, 24, 25, 44; 84, 85, 86, 87, 88) are provided to move the arm (7, 82).

7. Transmission according to claim 6, wherein the gear-changing means comprise a gear-change hub (15, 84) which is essentially concentric with respect to, and rotatable about, the main shaft (18, 68), whilst the arm (7, 82) runs essentially radially with respect to the main shaft (18, 68) and at its radially innermost end has a nose (24, 86) which engages in a slot (25, 87) in the gear-change hub (15, 84).

8. Transmission according to claim 7, wherein the slot (25, 87) is elongated, such that the width thereof corresponds to the width of the nose (24, 86), and the slot (25, 87) crosses the main shaft (18, 68) in such a way that, after the shafts (4, 10; 75, 81) have been brought into the oblique arrangement with the resultant movement of the slider (5, 74) and of the arm (7, 82) connected thereto, the nose (24, 86) slides in the slot (25, 87), the arm (7, 82) pivoting back and the shafts (4, 10; 75, 81) consequently being brought out of oblique arrangement.

9. Transmission according to claim 7, wherein the angle at which the slot (25, 87) runs with respect to the main shaft (18, 68) is so chosen that interaction of the nose (24, 86) and the slot (25, 87) does not itself produce a braking effect and the arm (7, 82) can be pivoted between two stops (117, 118) which restrict the deflection of the arm (7, 82).

10. Transmission according to claim 9, wherein the pivot (23, 83) of the arm (7, 82) is located at that end of said arm (7, 82) which is outermost in the radial direction with respect to the main shaft (18, 68).

11. Transmission according to claim 1, wherein each intermediate wheel (9, 59) interacts by means of teeth (9a, 59a) with corresponding teeth (11a, 66a) on the sun wheel (11, 66).

12. Continuously variable transmission, comprising a sun wheel (11, 66), at least one planet wheel (3, 65) having a double, essentially conical surface (30, 31, 64, 71, 72), which planet wheel (3, 65) interacts on one side with an annulus wheel (2, 73), as well as adjusting means (5, 6, 16) for changing the transmission ratio, characterized in that each planet wheel (3, 65) is provided with an intermediate wheel (9, 59) which interacts on one side with the sun wheel (11, 66) and on the other side with said planet wheel (3, 65) on the other side of the planet wheel (3, 65) from said annulus wheel (2, 73), wherein each planet wheel (3, 65) and/or each intermediate wheel (9, 59) is mounted so as to be movable along its center line.

13. Continuously variable transmission, comprising a sun wheel (11, 66), at least one planet wheel (3, 65) having a double, essentially conical surface (30, 31, 64, 71, 72), which planet wheel (3, 65) interacts on one side with an annulus wheel (2, 73), as well as adjusting means (5, 6, 16) for changing the transmission ratio, characterized in that each planet wheel (3, 65) is provided with an intermediate wheel (9, 59) which interacts on one side with the sun wheel (11, 66) and on the other side with said planet wheel (3, 65) on the other side of the planet wheel (3, 65) from said annulus wheel (2, 73), wherein a conical clamping ring (115) is provided on the outside of two casing halves (112, 113) which make up a transmission casing, which clamping ring (115) interacts with a supporting ring (116), which is likewise conical, in order to adjust the diameter of the annulus wheel (2, 73).

14. Continuously variable transmission, comprising a sun wheel (11, 66), at least one planet wheel (3, 65) having a double, essentially conical surface (30, 31, 64, 71, 72), which planet wheel (3, 65) interacts on one side with an annulus wheel (2, 73), as well as adjusting means (5, 6, 16) for changing the transmission ratio, characterized in that each planet wheel (3, 65) is provided with an intermediate wheel (9, 59) which interacts on one side with the sun wheel (11, 66) and on the other side with said planet wheel (3, 65) on the other side of the planet wheel (3, 65) from said annulus wheel (2, 73), wherein sun wheel (11, 66) and each intermediate wheel (9, 59) are positioned in the axial direction with respect to one another by means of a peripheral rib which interacts with a peripheral groove.

15. Continuously variable transmission, comprising a sun wheel (11, 66), at least one planet wheel (3, 65) having a double, essentially conical surface (30, 31, 64, 71, 72), which planet wheel (3, 65) interacts on one side with an annulus wheel (2, 73), as well as adjusting means (5, 6, 16) for changing the transmission ratio, characterized in that each planet wheel (3, 65) is provided with an intermediate wheel (9, 59) which interacts on one side with the sun wheel (11, 66) and on the other side with said planet wheel (3, 65) on the other side of the planet wheel (3, 65) from said annulus wheel (2, 73), wherein the intermediate wheel (9) has a conical surface (26) and a ring (27), which protrudes with respect to said surface, and the sun wheel (11) has a conical surface (28), .which interacts with said conical surface (26) and is provided with a peripheral groove (29), the depth of which is greater than the distance over which the ring (27) protrudes with respect to the conical surface (26) of intermediate wheel (9), which ring (27) projects into groove (29).

16. Transmission according to claim 15, wherein the slider (5) is provided with fixed mountings (20) and movable mountings (22), each for one intermediate wheel (9).

17. Transmission according to claim 16, wherein the shaft (10) of the intermediate wheel (9) is mounted in a yoke, the arms (37, 38) of which are mounted in the mountings (20, 22) on the slider (5).

18. Transmission according to claim 17, wherein the movable mounting (21) of the planet wheel (3) is mounted on a ring (51) and the movable mounting (22) of the intermediate wheel is mounted on a ring (57), which rings (51, 57) are coaxially rotatable with respect to the flange (42) and, via journals (53 and 56 respectively), interact with slots respectively provided in the arm (7).

19. Transmission according to claim 15, wherein the sun wheel (11) is axially movable on a drive hub (13) rotatably mounted on the main shaft (18), and sun wheel (11) and drive hub (13) are coupled by regularly distributed thrust arms (12) which cross the centre line of the main shaft (18) and, when a driving torque is applied to the drive hub (13), attempt to push the sun wheel (11) away in the axial direction in such a way that the conical surface (28) of the sun wheel (11) is forced against the conical surface (26) of the intermediate wheel (9) as a function of the torque.

20. Transmission according to claim 19, wherein the drive hub (122) carries a pressure element (124) which is rotatable and is slidable in the axial direction, the thrust arms (137) being coupled to said pressure element, which pressure element (124) is forced in the direction away from the sun wheel (11) under spring pretensioning (126), and pressure element (124) and drive hub (122) interact via a screw connection (127), which screw connection (127), when a driving torque is applied to the drive hub (122), attempts to move the pressure element (124) against the spring pretensioning (126) in the direction of the sun wheel (11).

21. Transmission according to claim 19, wherein the sun wheel (11) is pushed under spring pretensioning in the direction away from the drive hub (13, 122).

22. Transmission according to claim 19, wherein a wheel hub (1) is provided which is rotatably supported on one side on the outside of a drive hub (13) and on the other side on the slider carrier (6), the annulus wheel (2) being fixed to the inside of said wheel hub (1).

23. Transmission according to claim 15, wherein that surface of the planet wheel (3) which interacts with the annulus wheel (2) has a first conical surface (30) which axially is on the outside and has a top angle which differs from that of the second conical surface (31) which adjoins said first conical surface and is located further inwards.

24. Continuously variable transmission, comprising a sun wheel (11, 66), at least one planet wheel (3, 65) having a double, essentially conical surface (30, 31, 64, 71, 72), which planet wheel (3, 65) interacts on one side with an annulus wheel (2, 73), as well as adjusting means (5, 6, 16) for changing the transmission ratio, characterized in that each planet wheel (3, 65) is provided with an intermediate wheel (9, 59) which interacts on one side with the sun wheel (11, 66) and on the other side with said planet wheel (3, 65) on the other side of the planet wheel (3, 65) from said annulus wheel (2, 73), wherein the intermediate wheel (59) has a cylindrical surface (60), the sun wheel (66) has a cylindrical surface (62) which interacts with said cylindrical surface (60) and the maximum diameter of the intermediate wheel (59) is greater than the smallest gap between the surfaces of planet wheel (65) and sun wheel (66), such that the intermediate wheel (59) can be forced as a wedge between planet wheel (65) and sun wheel (66).

25. Transmission according to claim 24, wherein the intermediate wheel (59) has a cylindrical ring (61), which protrudes with respect to the surface (60) of said wheel, and the surface (62) of the sun wheel (66) is provided with a peripheral groove (63), the depth of which is greater than the distance over which the ring (61) protrudes with respect to the cylindrical surface (60) of the intermediate wheel (59), which ring (61) projects into groove (63).

26. Transmission according to claim 24, wherein the essentially conical surface (64) of the planet wheel (65), which surface interacts with the annulus wheel (73), has a slight convex curvature.

27. Transmission according to claim 24, wherein the intermediate wheel (59) can be forced under spring pretensioning in the wedge between sun wheel (66) and planet wheel (65).

28. Transmission according to claim 24, wherein the shaft (81) of the intermediate wheel (59) is mounted in a yoke (92), one arm (93) of which is mounted on the slider carrier (76) and another arm (94) of which is movably supported around the main shaft (68).

29. Transmission according to claim 28, wherein that arm (94) of the yoke (92) which is movably supported around the main shaft (68) works in concert with a supporting ring (95) which is rotatably mounted on the main shaft, which supporting ring (95) carries a lip (96) which extends essentially axially with respect to the main shaft (68) and is provided with a slot (97) in which the nose (86) of arm (82) is accommodated so that it is slidable in the axial direction of the main shaft (68).

30. Transmission according to claim 29, wherein the movable mounting (79) of the planet wheel (65) is mounted on a ring (99) which is coaxially rotatable with respect to the slider carrier and which interacts with the arm (82) via a journal (100).

31. Transmission according to claim 24, wherein each shaft (75) of a planet wheel (65) is held by means of a yoke (101) against tangential movement with respect to the main shaft (68), which yoke (101) is mounted on the slider carrier (76) so as to be axially slidable against a supporting roller (102).

32. Transmission according to claim 24, wherein the sun wheel (66) is provided with two gear wheels (66*a*), which are rotatably mounted on the main shaft (68) and are located either side of a fixed collar (123) provided on the main shaft, through which collar at least one pin (121) extends transversely, and the ends of the pin (121) project, in each case, into a hole (125) in one of the gear wheels (66*a*), which pin (121) can be pivoted about a radially aligned pivot axis, such that the gear wheels can undergo movement through an angle which is of equal magnitude but in the opposite direction, which gear wheels (66*a*) interact with teeth (59*a*) provided on each intermediate wheel (59).

\* \* \* \* \*